Dec. 19, 1961 F. VOLAVSEK 3,013,282
LITTER OR STRETCHER
Filed March 12, 1957
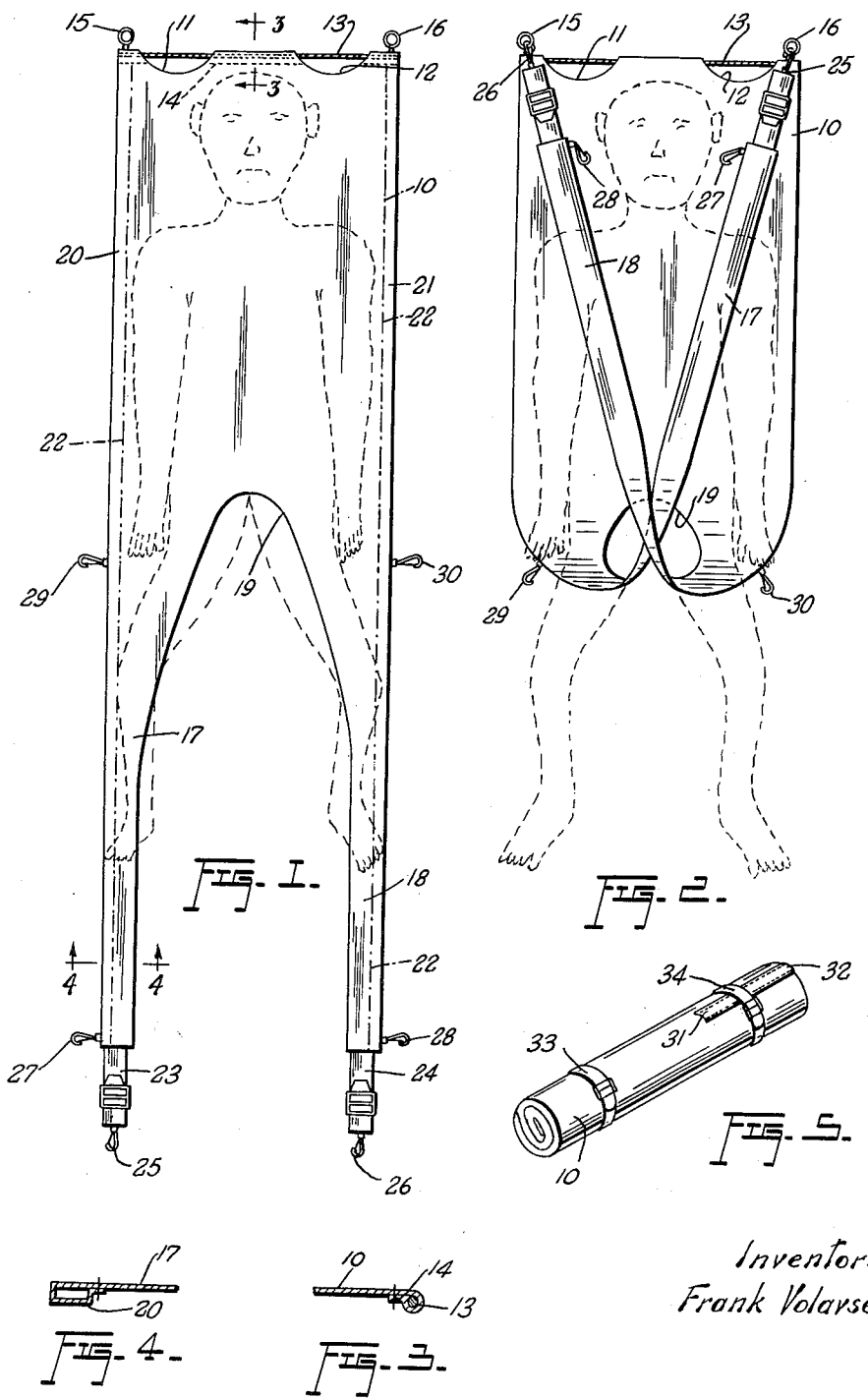
Inventor:
Frank Volavsek

3,013,282
LITTER OR STRETCHER
Frank Volavsek, 25—19 30th Drive, Astoria, N.Y.
Filed Mar. 12, 1957, Ser. No. 645,562
4 Claims. (Cl. 5—82)

This invention relates to litters or stretchers.

Among other objects, the invention aims to provide a litter or stretcher which can be pulled under the prone body of an injured or helpless person, which is adaptable for use by a single person when carrying the patient on his back, which is usable by two persons carrying a body on the litter with the aid of poles or rifles, and which is light in weight, easily manufactured on a large scale, and can be rolled up to occupy little space. Other objects and advantages will be apparent from the following description of a preferred embodiment of the invention shown in the accompanying drawings forming a part of this specification.

In said drawings:

FIG. 1 is a plan view of the litter, a body being shown diagrammatically lying prone on the litter;

FIG. 2 is a plan view showing the litter with its two straps brought up under the crotch of the body and snapped onto rings at the head end of the litter thereby forming a sort of sling for the body;

FIG. 3 is a section on line 3—3 of FIG. 1;

FIG. 4 is a section on line 4—4 of FIG. 1; and

FIG. 5 is a perspective view showing the litter rolled up and secured.

Referring particularly to the drawings, I have shown a stretcher or litter made of a sheet 10 of flexible fabric such as nylon cloth or light canvas. Sheet 10 is generally rectangular. At the end on which the head of the body rests, the sheet 10 is cut away as at 11, 12 to provide hand holes, and a rope 13 is secured in a seam 14 at said end, the rope extending across the openings for the hands. A pair of metal, preferably rust-proof, rings 15, 16 are secured at the corners of the sheet 10 for a purpose to be described. Forming integral parts of sheet 10 are a pair of appendages 17, 18 extending parallel to each other. These appendages are strap-like, and their outer edges are continuous with the outer straight edges of the main body of sheet 10. The inner edges of appendages 17, 18 are parallel for about half their lengths, then converge and finally meet in a curve shown at 19. Thus the straps formed by the appendages are three to four times as wide at the ends where they join sheet 10 as at their free ends. Seams 20, 21 are formed by stitching 22 to extend the entire length of the litter on either side, each seam being wide enough to receive a rifle barrel or a wooden or metal pole (not shown) inserted at either end of the litter. Adjustable webbings or straps 23, 24 are secured to the extremities of the appendages and snap hooks 25, 26 are secured to the ends of the adjustable straps; the snap hooks being engageable with rings 15, 16 as will be explained.

Another pair of snap hooks 27, 28 are secured to the outer edges of appendages 17, 18 near their free ends, and still another pair of snap hooks 29, 30 are secured to the same outer edges at points near the juncture of the appendages with the sheet 10. Thus there are a pair of snap hooks 27, 29 and 28, 30 projecting from each outside edge of each appendage; the purpose being to permit the attachment of a rifle to each side of the litter for carrying the litter. Finally, there is a strip of fabric 31 stitched to the outside of the litter but having an open end 32 into which the end of a rifle barrel may be inserted. This permits the litter, when rolled as in FIG. 5 and secured by webbings 33, 34, to be carried on the end of a single rifle and at the same time it will afford a certain protection to the barrel especially against rain, dust, etc.

Assuming that the patient or injured person is lying down on his back, or can be moved into that position, the litter is placed with the curved edge 19 under the patient's head and is pulled under his body by pulling on both appendages at the same time. Then the appendages are crossed and brought up through the crotch of the patient and secured as shown in FIG. 2, if the patient is to be carried on the back of the man attending him. The arms of such a man will be inserted through the loops formed by the appendages and thus the load will be sustained by his back. The crossed appendages then provide a sling or seat as FIG. 2 makes clear. The appendages are made longitudinally adjustable, in effect, by the adjustable webbings or straps 23, 24 fixed to their ends, thereby making the litter itself adaptable to patients of different heights and weights. If there are two soldiers or hospital corpsmen available for the rescue, the patient may lie as indicated in dotted lines in FIG. 1 and either two poles or two rifles (not shown) may be used to support the litter in a stretched-out or extended position, as will be understood from the foregoing description. The patient's legs may be tied by strings, ropes or strips of torn clothing (not shown), to prevent the legs from dropping and to hold the patient on while changing the angle of the litter. The rope 13 at the hand holes facilitates handling and carrying the litter, and other strips of cloth or ropes may be inserted through the hand holes and secured to rope 13 to hold the patient on the litter. Sometimes this is essential if the patient is delirious.

The many advantages of the litter will be obvious from what has been said. It is also obvious that many changes in the construction may be made, within the scope of the appended claims.

I claim:

1. A litter comprising a sheet of flexible material having a generally rectangular form with two elongated flexible tail-like appendages fixed thereto at one end and extending parallel to each other, the appendages being longer and very much narrower than the sheet, attaching means on the other end of the sheet, and cooperating manually engageable attaching means on the free ends of the two appendages to secure the appendages in crossed loops to said other end of the sheet.

2. The invention defined in claim 1, wherein there are longitudinally extending seams running the entire length of the sheet and each appendage, said seams being open at one end and being wide enough to receive a pole or rifle barrel.

3. The invention defined in claim 1, wherein there are snap hooks secured to the outer edges of the two appendages, near the free ends of the appendages and near the ends where the appendages are attached to the sheet, said snap hooks being adapted to be snapped onto the rings or loops of two military rifles, so that the litter bearing a wounded soldier may be carried by two persons grasping the two rifles at opposite ends of the litter.

4. A litter capable of being carried on the back of one man consisting of a flexible sheet having two flexible narrow appendages secured to one end of the sheet, said appendages being of equal length and such length being greater than the length of the flexible sheet, fastener means on the free ends of the appendages, and cooperating fastener means to temporarily secure the free ends of the appendages to the other end of the sheet with the appendages crossed to provide a sling or seat for the patient.

References Cited in the file of this patent

UNITED STATES PATENTS

| | | |
|---|---|---|
| 439,263 | Zein | Oct. 28, 1890 |
| 484,093 | Goltermann | Oct. 11, 1892 |
| 841,702 | Martin | Jan. 22, 1907 |
| 1,096,489 | Chadwick | May 12, 1914 |
| 1,369,638 | Edmonds | Feb. 22, 1921 |
| 1,518,830 | Woods | Dec. 9, 1924 |
| 2,273,672 | Van Gasselt | Feb. 17, 1942 |
| 2,309,464 | Lucci | Jan. 26, 1943 |
| 2,570,963 | Mesmer | Oct. 9, 1951 |
| 2,589,708 | Koster | Mar. 18, 1952 |

FOREIGN PATENTS

| | | |
|---|---|---|
| 522,691 | Germany | Apr. 13, 1931 |